Sept. 21, 1965  J. H. ANDRESEN  3,206,974
INTEGRATED FLIGHT INSTRUMENT SYSTEM
Filed May 6, 1959  4 Sheets-Sheet 1
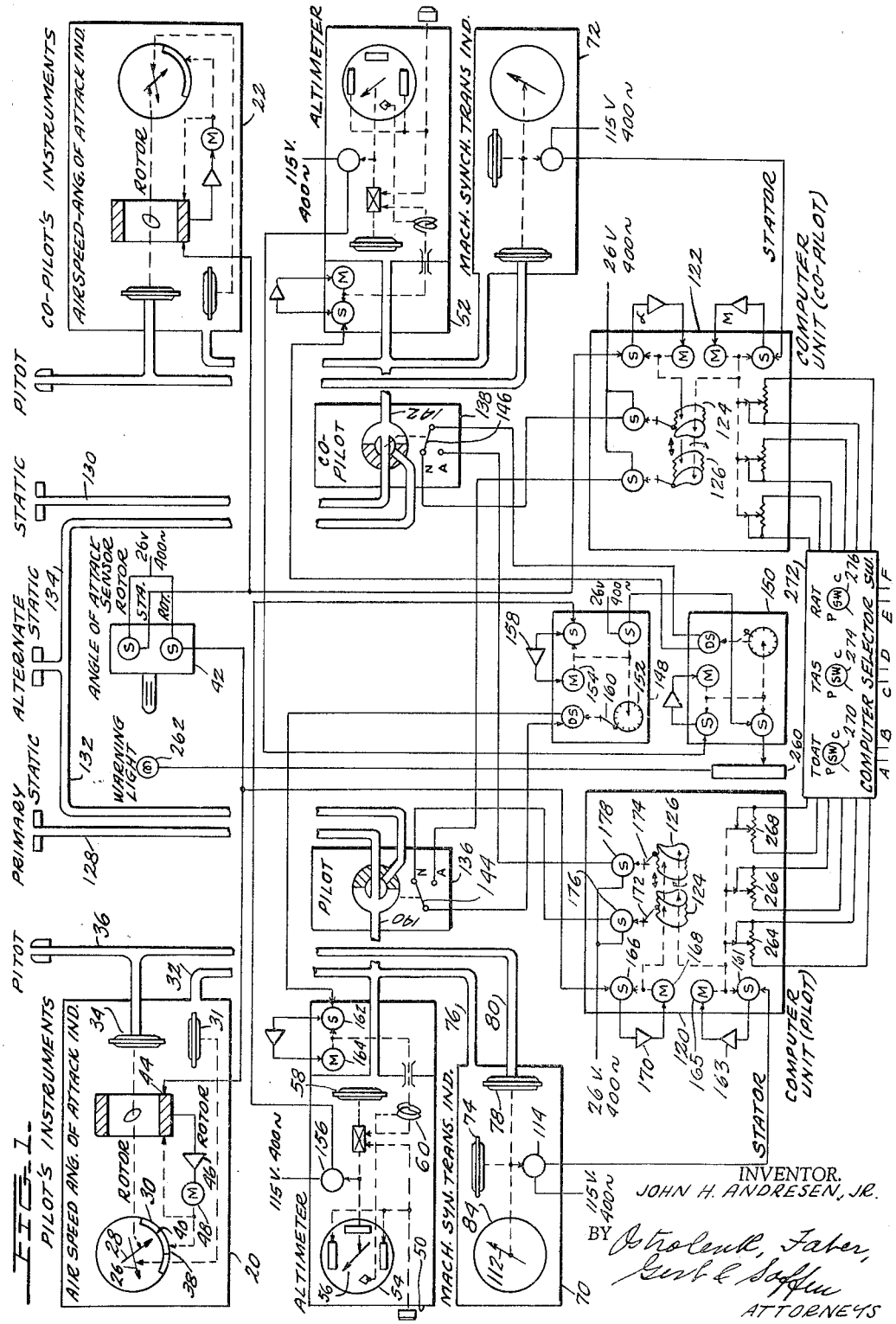
INVENTOR.
JOHN H. ANDRESEN, JR.
BY Ostrolenk, Faber,
Gerb & Soffen
ATTORNEYS Sept. 21, 1965 J. H. ANDRESEN 3,206,974
INTEGRATED FLIGHT INSTRUMENT SYSTEM
Filed May 6, 1959 4 Sheets-Sheet 2

INVENTOR.
JOHN H. ANDRESEN, JR.
BY Ostrolenk, Faber,
Gerb & Soffen
ATTORNEYS

Sept. 21, 1965   J. H. ANDRESEN   3,206,974
INTEGRATED FLIGHT INSTRUMENT SYSTEM
Filed May 6, 1959   4 Sheets-Sheet 3

INVENTOR.
JOHN H. ANDRESEN, JR.
BY Ostrolenk, Faber,
Gerb & Soffen
ATTORNEYS

Sept. 21, 1965   J. H. ANDRESEN   3,206,974
INTEGRATED FLIGHT INSTRUMENT SYSTEM
Filed May 6, 1959   4 Sheets-Sheet 4

INVENTOR.
JOHN H. ANDRESEN, JR.
BY
ATTORNEYS

3,206,974
INTEGRATED FLIGHT INSTRUMENT SYSTEM
John H. Andresen, Greenwood Lake, N.Y., assignor to Kollsman Instrument Corporation, Elmhurst, N.Y., a corporation of New York
Filed May 6, 1959, Ser. No. 811,507
4 Claims. (Cl. 73—178)

This invention relates to the inter-relation of a plurality of aircraft flight instruments and error correctors for these instruments in a novel manner whereby maximum performance of the instruments is realized.

This system is particularly applicable to a system using a duplicate set of instruments and error correcting means therefor for the pilot and copilot respectively of the aircraft. More specifically, the following instruments and correcting means are provided:

(1) A combined airspeed-angle of attack indicator.
(2) An altimeter.
(3) A mach meter.
(4) A true outside air temperature indicator.
(5) A true airspeed indicator.
(6) A ram air temperature indicator.
(7) A scale error corrector specifically for the altimeter.
(8) A computer unit for correcting the various instruments for static system errors such as those due to varying angle of attack and mach number.
(9) An angle of attack sensor.

The essence of the instant invention is to interrelate the various components set forth above which are provided in duplicate, one for the pilot and one for the copilot, in a novel manner.

The following is a list of specific novel interrelations between these various instruments:

(1) The corrected readings of the pilot's and copilot's altimeters are compared to one another as a check on the accuracy of the other. Responsive to a predetermined difference in the output of these units, a warning signal is initiated and the cause of the mismatch can be determined. When the faulty unit is found and cannot be corrected, it can be cut out of the system and the computer function can be taken over by the single computer which is left. If necessary, however, both of the error correcting means, including the computer and the scale error correctors, can be completely disconnected from the system and the altitude, indicated air speed, and mach instruments can be driven by pure pneumatic means.

(2) Since for most accurate operation, each of the above altimeters should be corrected for mach number, the mach meter is provided with a synchro transmitting means, hereinafter described as a Synchrotel, which has an output corresponding to the mach number indication. This mach number signal is delivered to each computer unit which, in turn, delivers a mach number correction to each of the various instruments requiring such correction.

(3) Both a primary and alternate static pressure conduit means for impressing the static pressure upon the various diaphragm actuating means of the instrument are provided. These two static pressure means are independent of one another and are switched into the system by a switch controlled by the pilot for his static system selection and by the copilot for his static system selection. The respective valve for controlling the static system to be used for the pilot and copilot instruments is further associated with an electrical switch which communicates with the computer unit for utilizing the computer components correlated with the primary static system or the alternate static system. Thus, it is assured that when on the primary static system, the computer unit will be making corrections related to that primary system, while when on the alternate static system the computer unit will be making the corrections required of the alternate static system. It is to be noted that by providing both a primary and alternate static system for each of the pilot's instruments and the copilot's instruments that there is a four-way check between the two computer units available to determine which portion of which computer is delivering an erroneous signal when such an erroneous signal is detected by the warning means described above in item 1.

(4) Since each of the true outside temperature indicator, true airspeed indicator and ram air temperature indicator are actuated responsive to some function of mach number and temperature, they are each actuated electrically from the computer unit which receives the input signal related to mach number and delivers the required function of mach number required by each respective instrument to that instrument. An externally mounted temperature bulb measures the outside temperature and delivers this to each of the meters in the required manner. The input mach number function required of each of the meters may be taken from either the pilot's computer or the copilot's computer when on either the primary static or alternate static system.

Thus, the above noted indicator devices may be energized from a single temperature bulb and a selection of four different sources for their mach number correction. Therefore, the pilot and copilot may choose the mach number correction proven accurate by a comparison of the four different systems and energize the pilot's indicators as is required.

(5) A single measurement by an angle of attack sensor is utilized to drive an angle of attack indicator mounted in a novel manner on an airspeed-angle of attack indicator. This same signal is applied to each of the pilot and copilot computer units responsible for the static system correction of the altimeter.

(6) The true outside air temperature is measured by a true outside air temperature indicator which has inputs from the mach meter and an externally positioned temperature bulb. Since the true airspeed indicator and the ram air temperature indicator both operate in accordance with some function of the temperature, these functions are taken from the true outside air temperature indicator, thus doing away with the requirement for temperature measuring bulbs for each of the true airspeed indicator and the ram air temperature meter.

Accordingly, the primary object of this invention is to provide a novel integrated flight instrument system.

Another object of this invention is to combine the various outputs of instrument and error correcting means utilized in a flight instrument system, so that the outputs of certain of the instruments may be utilized in the operation of other instruments.

Another object of this invention is to provide duplicate instrument and error correcting means for the pilot and copilot wherein the operation of the various instruments may be compared and warning means actuated responsive to a predetermined deviation in the pilot instrument readings and the copilot instrument readings.

A further object of this invention is to provide a novel flight instrument system wherein a computer unit operating the pilot's instruments and a computer unit operating the copilot's instruments may have their outputs compared so as to detect the malfunctioning of one of the units.

Another object of this invention is to provide a primary and alternate static pressure system for driving various instruments within a flight instrument system having a computer means for making computed corrections of the instrument reading wherein the computer means has a first and second computer device corresponding to the primary and alternate static systems which are automatically switched in responsive to the switching of their corresponding pressure system.

Another object of this invention is to provide a mach number signal from a first and second mach meter and applied to a first and second respective computer, which computers selectively deliver an output signal to instruments requiring this correction.

A still further object of this invention is to provide a novel integrated flight system having an angle of attack sensor means which delivers a signal to drive an angle of attack indicator mounted on the same instrument as the airspeed instrument indicator in a novel manner, and to further utilize the angle of attack signal to drive the computer which, in turn, corrects the reading of an altimeter.

A still further object of this invention is to provide a novel integrated flight instrument system wherein a true outside air temperature meter measures and corrects temperatures and supplies required functions of that temperature to either or both of a true airspeed indicator and ram airspeed indicator and any similar indicating devices requiring some function of temperature for the driving thereof.

Another important object of my invention is to provide a novel integrated flight system wherein basic uncorrected information is furnished through conventional mechanical and pneumatic means and the reliability of the instrument is unaffected by electronic refinements required for extreme accuracy and additional information.

Still another object of my invention is to provide a novel flight system wherein duplication of instrumentation which is usually encountered in obtaining the same data individually is avoided by combining all necessary components into a single integrated system.

These and other objects of my invention will become apparent from the following description when taken in connection with the drawings, in which:

FIGURES 1 and 1a schematically show a preferred embodiment of the integrated flight system of the invention.

Figure 1A:
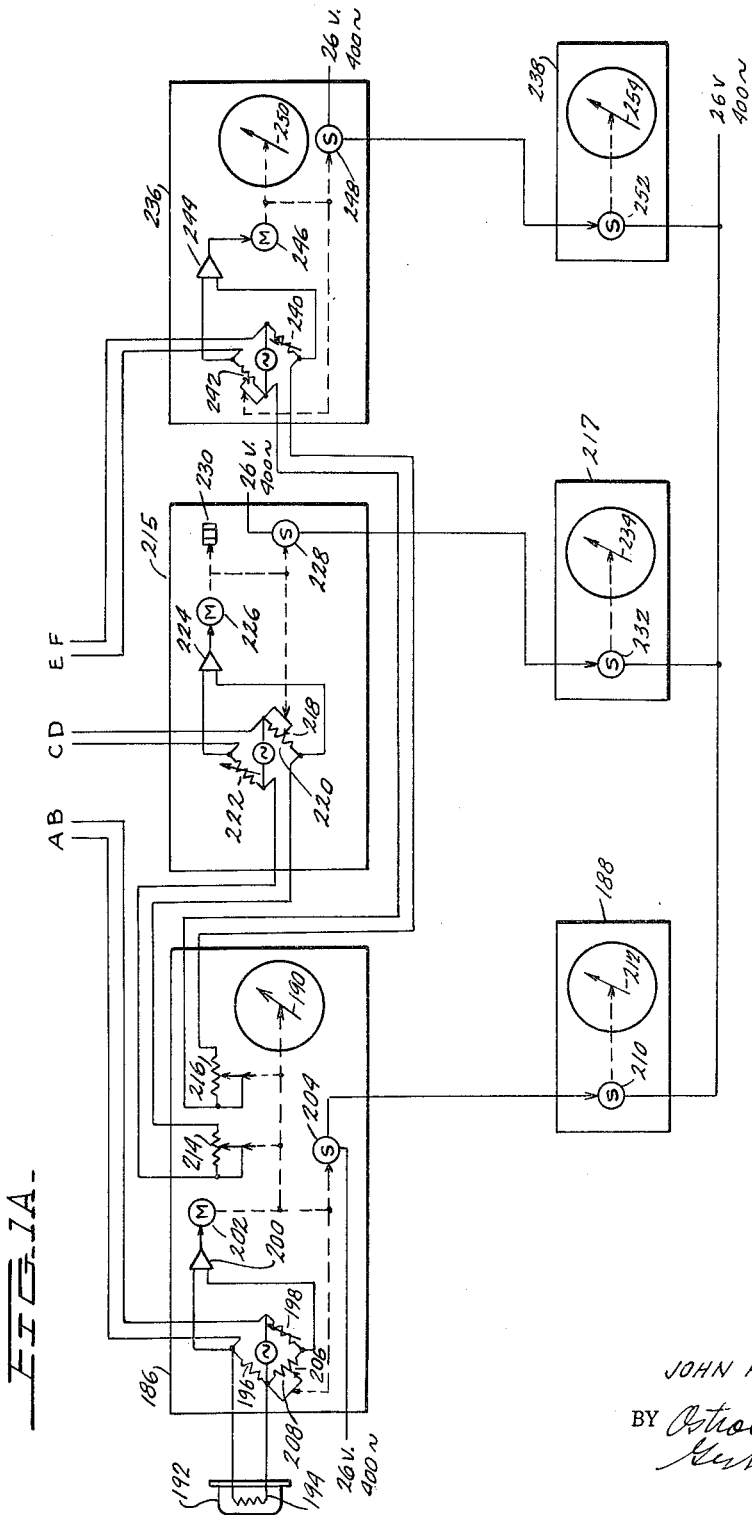

FIGURES 1 and 1a set forth a schematic diagram of a preferred embodiment of this novel integrated flight instrument system. Before discussing the novel correlation between the various instruments shown in FIGURE 1, a discussion of each individual instrument will be given first.

In general it will be noted that the pilot's instruments are set forth on the left-hand side of the figure, while the copilot's instruments, which duplicate the pilot's instruments, are set forth on the right-hand side of the diagram. In the following description the pilot's instruments and the copilot's instruments will be identified with distinctive numerals, while the internal mechanism of these instruments will be identified with similar numerals, since a description of any particular instrument is true of either the pilot's or the copilot's instruments.

Airspeed-angle of attack indicator

Figures 2, 3:
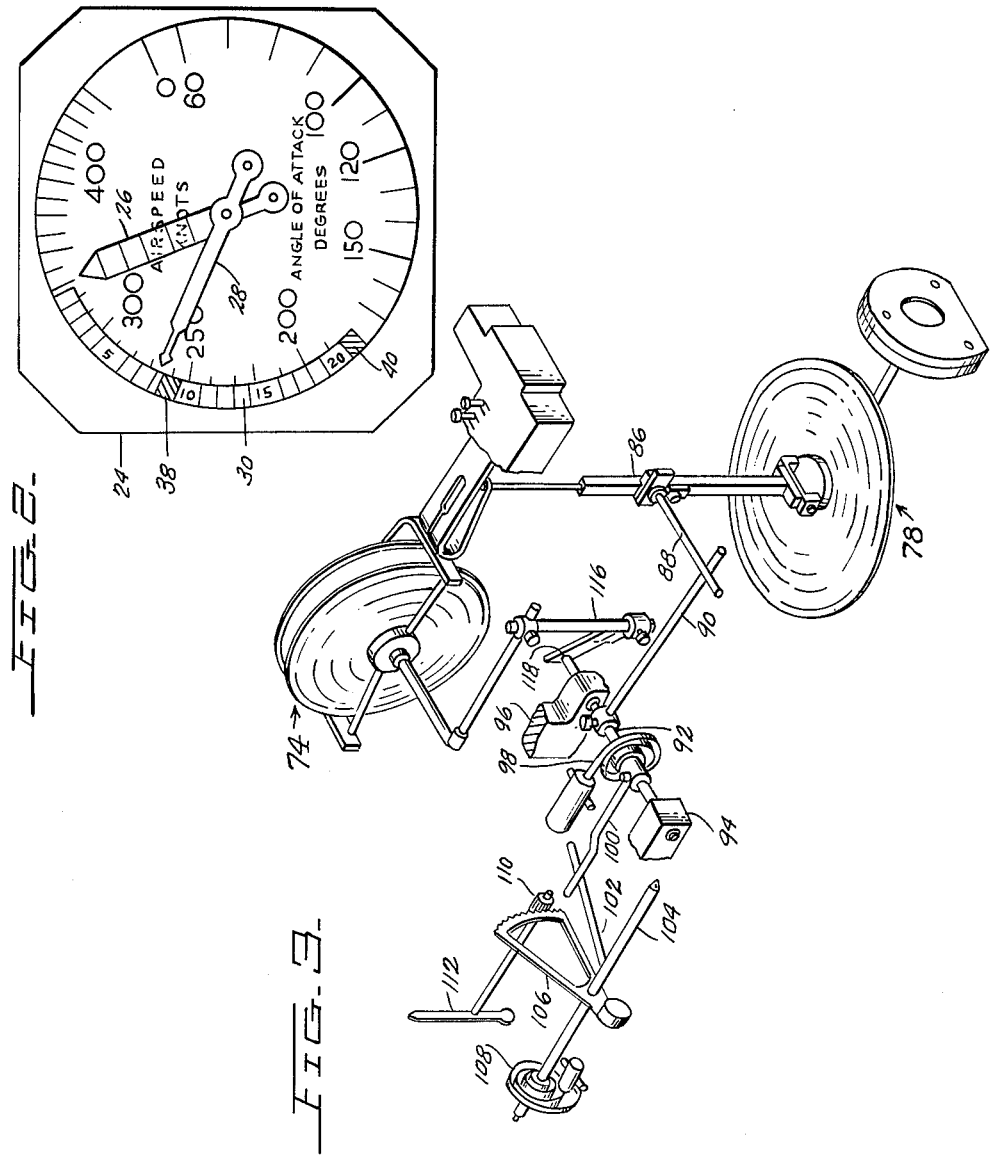
FIGURE 2 shows the view of the dial and indicating pointers of the novel combined airspeed-angle of attack indicator of FIGURE 1.
FIGURE 3 shows a perspective view of the mach meter of this invention.

Both the pilot and copilot have identical air speed-angle of attack indicators 20 and 22 respectively, as shown in FIGURE 1, with the instrument face shown in FIGURE 2. This instrument presents to the pilot and the copilot and on a single display, the indicated airspeed, the maximum permissible speed and the angle of attack. Thus, the instrument display seen generally at numeral 24 is comprised of a maximum speed pointer 26, an indicated airspeed pointer 28 and an angle of attack indicator 30. The angle of attack indicator 30 is an adjustable segment having inscribed lines thereon. The indicated airspeed pointer 28 is used to read the angle of attack value of the aircraft from angle of attack indicator segment 30.

The maximum allowable speed indicator is operable from an altitude diaphragm 31, as schematically indicated, which is externally subjected to the outside static pressure which is introduced into the housing 20 through a conduit 32.

The motion of maximum speed pointer 26 as a function of altitude can be controlled along a predetermined pattern by a suitable connecting linkage connecting diaphragm 31 to pointer 26. The motion of pointer 26 can, therefore, be limited in different altitude ranges by different parameters such as mach number or equivalent airspeed. Such linkages are shown in U.S. Patent 3,132,323. For example, between 5,000 and 30,000 feet the aircraft speed may be limited by equivalent airspeed, while from sea level to 5,000 feet by a limiting indicated airspeed, and when above 30,000 feet the limitation might be that of the Mach number.

The airspeed pointer 28 is connected, as indicated by dotted lines, to the airspeed capsule 34 which is subjected to pitot pressure o nits interior from the Pitot tube 36 in the usual manner. Note that the dotted line connection from capsule 34 to airspeed pointer 28 can include conventional mechanism for converting linear dimensional changes in capsule 34 to rotational changes in the position of pointer 28.

Hence, on a single respective instrument, both the pilot and the copilot have a comparison between the indicated airspeed of pointer 28 and the maximum allowable speed of pointer 26, and they may operate the aircraft accordingly. It is further important that the pilot know the angle of attack of the aircraft and whether he is above or below approach and stall angles, as indicated by the movable segment 30.

The angle of attack segment 30 may have inscribed thereon a first and second indication indicated by lines 38 and 40 respectively which correspond to an approach speed and stall speed respectively, these lines being positioned continuously by segment 30 with respect to the calibrated airspeed around the airspeed dial. This may be more clearly understood from FIGURE 2 which shows the display 24 wherein the airspeed is logarithmically calibrated around the circumference of the display dial.

In the particular illustration in FIGURE 2, the approach speed index 38 has been inscribed to correspond to an angle of attack of 9 degrees while the stall speed index 40 is inscribed to correspond to an angle of attack 22 degrees. In reading the above dial, the maximum permissible airspeed as given by the maximum speed pointer 26 is 330 knots, the indicated airspeed is 265 knots as given by indicating airspeed pointer 28, while the angle of attack indicating segment 30 shows that the approach speed is slightly lower than the existing speed. Note that actual speed values cannot be read on the angle of attack markers and these markers only show whether the pilot should increase or decrease airspeed to get to the angle of attack designated by the marker.

The angle of attack indicating segment 30 is, as seen in FIGURE 1, driven from an angle of attack sensor 42. The angle of attack sensor 42 contains two synchro transmitters which are connected to the stators of synchro devices 44 in devices 20 and 22 respectively. The synchro device 44 may be of the "Synchrotel" type which is a registered trademark of the Kollsman Aircraft Instrument Corporation. Synchrotel type synchros are of the type fully shown in U.S. Patent 2,571,810. The rotor of Synchrotel 44 is mechanically connected to the pointer 28. An error signal, which is related to the difference in angular position of the rotor and stator of device 44, is then amplified by amplifier 46 to thereby drive motor 48 which is in turn mechanically connected to position the angle of attack segment 30. However, motor 48 is further connected to position the stator of Synchrotel 44 as it positions angle of attack indicator segment 30 to bring the error signal back to zero. As soon as the angle of attack segment 30 is properly positioned, the error signal due to a mismatch between the rotor and stator of servo 44 which was initially caused by angle of attack sensor 42 is brought to zero and the angle of attack indication is in accordance with the signal delivered by angle of attack sensor 42. Details of the manner in which the angle of attack sensor operates are well known to the art and need not be further described. The schematic representation of the Synchrotel type device is well known to the industry. Generally, it has a rotor shown connected to capsule 34 which is adapted to rotate with pointer 28 when capsule 34 expands or contracts. The outer housing of device 44 is formed of two windings which are rotated by motor 48. The angle of attack sensor is electrically connected to one of these windings as shown.

It is to be further noted that the angle of attack sensor also is used for correction of certain static system errors. For this purpose, a separate synchro in the sensor sends angle of attack measurements to the computer.

Altimeter

As further shown in FIGURE 1, both the pilot and copilot have an altimeter 50 and 52 respectively. The specific altimeter set forth in FIGURE 1 has been fully disclosed in copending application Serial No. 612,780 filed September 28, 1956 entitled Aircraft Instrument Remote Control Fail Safe in the name of James W. Angus, now U.S. Patent No. 3,009,358, and will be only briefly described here.

Thus, the altimeter comprises a display 54 having an altitude indicating pointer 56 and a drum showing thousands of feet which are driven from a diaphragm 58 which is externally exposed to static pressure over the conduit 76. The diaphragm operated mechanism is rotatably mounted with respect to the indicating dial, as has been set forth in the above noted copending application. The mechanism is rotated and thus the pointer 56 rotates therewith by electrically operated servo-correction means responsive to scale error correction for the specific altimeter and static system corrections for the particular angle of attack and mach number of the aircraft.

These inter-relations, however, will be set forth more fully hereinafter, it being sufficient to understand at this point that the electrically driven servo-mechanism is associated with a spring return mechanism 60 which will return the altimeter to uncorrected pneumatic operation under control of diaphragm 58 when electrical power is removed.

Mach number indicator

Both the pilot's and copilot's instruments are provided with a Mach number indicator and transmitter 70 and 72 respectively which is comprised of an external housing having a first diaphragm 74 therein which is externally exposed to static pressure from the conduit 76, and a second diaphragm 78 which is externally exposed to the static system pressure from conduit 76 and is internally exposed to pressure of Pitot 36 over the conduit 80.

The outputs of the two diaphragms 74 and 78 are combined to position Mach number indicating pointer 112 of display 84 in the manner set forth in FIGURE 3 and schematically indicated in FIGURE 1.

To fully understand the Mach meter operating mechanism of FIGURE 3 it is to be first understood that the Mach number M is given from the following equation:

$$M = \sqrt{5\left(\left(1+\frac{\Delta p}{p_1}\right)^{2/7} - 1\right)}$$

where
M is the flight Mach number, $\Delta p$ is the pressure differential between the stagnation pressure at the head of the Pitot tube and the static pressure corresponding to the aircraft's altitude, and $p_1$ is the static pressure corresponding to the aircraft altitude.

Accordingly, in the mach indicator of FIGURES 1 and 3 the differenial pressure is measured in diaphragm 78 which, as best seen in FIGURE 1, is positioned in accordance with the difference in Pitot tube pressure and static pressure, while the static pressure is measured by diaphragm 74 which is evacuated and has the static pressure applied externally thereto over the static conduit 76.

Referring now to FIGURE 3, it is seen that differential pressure diaphragm 78 is connected to move a slidably mounted adjusting bracket assembly 86 which has an extending arm 88 mounted thereon. Arm 88 is engageable with respect to a perpendicular arm 90 which in turn is fastened to a sliding rocking shaft assembly 92 which is slidably mounted in fixed supports 94 and 96. Sliding rocking shaft assembly 92 is further biased to rotate in a counterclockwise direction by a biasing spring assembly 98, this motion being prevented normally by the engagement between arms 88 and 90.

Rocking shaft assembly 92 then has a further arm 100 perpendicularly fastened thereto which is engageable with arm 102 which is fastened to a pivotally mounted shaft 104 which has a counter-balanced gear sector 106 mounted thereon and is biased to rotate in a counterclockwise direction by biasing spring assembly 108, this rotation being normally prevented by the engagement between arms 100 and 102. Gear sector 106 then engages a hand-staff pinion 110 which has a pointer 112 mounted thereon.

The rotor of Synchrotel device 114 of FIGURE 1 is mounted between pinion 110 and pointer 112 so as to rotate responsive to rotation of the pointer 112, but is omitted from FIGURE 3 for the sake of clarity. However, it is to be understood that the Synchrotel device will have an output proportional to the Mach number indicated by pointer 112.

The positioning of pointer 112 through the above noted linkage as actuated by the differential pressure diaphragm 78 is corrected for static pressure by means of diaphragm 74 which turns an altitude rocking shaft assembly 116 responsive to expansion or contraction of diaphragm 74.

Altitude rocking shaft assembly 116 has an output arm 118 fastened thereto which engages one end of sliding rocking shaft assembly 92 whereby sliding rocking shaft assembly 92 is axially positioned responsive to rotation of arm 118. This axial position of assembly 92 will move the point at which arm 100 engages arm 102, thus varying the effective lever arm of arm 102 so as to control the rotation imparted to sector 106 responsive to a rotation of arm 100.

It has been found that with this type of linkage and with the arm dimensions properly proportioned, the above noted mach equation is satisfied over an appreciable range of ratio of differential pressure to static pressure. Thus, in operation, if the indicated airspeed of the aircraft increases, the differential pressure diaphragm 78 expands to thus allow a counterclockwise rotation of assembly 92 and a clockwise rotation of shaft 104 and sector 106. This in turn drives pointer 112 in a counterclockwise direction which, when seen from the other side of the pointer, corresponds to an increase in Mach number.

To compensate for changes in altitude, if the static pressure diaphragm expands due to an increase in altitude, the assembly 92 will be drive forward and the effective lever arm of arm 102 will be shortened. At the same time, the differential pressure on diaphragm 78 is changed so that, for a particular change in indicated airspeed, the change in Mach number will be decreased.

In summary, therefore, the mach meter of this novel integrated flight system positions a pointer through static measuring means. Since, as will be seen hereinafter, the Mach number of the aircraft is important in other instrument corrections and instrument readings, the Mach number pointer has a synchro device attached thereto whereby an electrical signal is generated and is to be subsequently utilized in these various electrical corrections.

Accordingly, each of the corrected instruments need not have their own pneumatic measuring system for Mach number and substantial duplication of equipment is avoided.

*Computer units and primary and alternate static pressure conduit means*

The three previously described instruments for both pilot and copilot (the airspeed-angle of attack indicator, the altimeter and the Mach indicator and transmitter) are the only three instruments within this novel integrated flight instrument system which require pressure inputs. The other instruments, as will be seen hereinafter, utilize functions previously computed within these above three instruments plus a temperature bulb for this own operation and are independent of other pressure systems.

The computer units for converting angle of attack measurements from angle of attack sensor 42 and Mach number from the Mach number indicator and transmitter 70 and 72 and for providing static error correction for the altimeter into useful electrical signals are the identical computer units 120 and 122 for pilot and copilot respectively.

Each of these computer units includes two three-dimensional cams 124 and 126 wherein the first corresponds to a primary static system and the second corresponds to an alternate static system.

More specifically, each of cams 124 and 126 positions a respective cam follower which in turn mechanically positions a respective synchro in accordance with the measured angle of attack and measured Mach number, as will be more fully described hereinafter. The cam surface is dependent upon the predetermined static characteristics of its respective static system, and the data for it is determined empirically or calculated for each airplane type.

Figure 4:
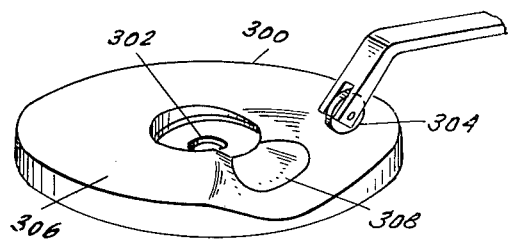
FIGURE 4 shows a typical cam for the error correcting computer of the system.

A typical cam structure is shown in FIGURE 4 in perspective for a disk type cam which is a disk 300 having a central mounting aperture 302 which receives a pivotal mounting means. A cam follower 304 rides on the cam surface 306 of disk 300, its vertical position being an index of the required correction signal. The cam surface 306 is contoured in accordance with predetermined flight characteristics of the aircraft, as described in copending application Serial No. 612,780 entitled "Aircraft Instrument, etc." and assigned to the assignee of the instant application, with a typical contour being shown by contour lines 308 in FIGURE 4. The vertical position of follower 304 will therefore depend upon the angular position of disk 300 about its pivot 302, and the radial distance of follower 304 from pivot 302. As is schematically illustrated in FIGURE 1, the angular position of disk 300 will be determined as some function of Mach number, while the radial position of follower 304 may be determined by some function of airspeed.

In accordance with the invention, both a primary static system having conduits 128 and 130 as inputs therefor for the pilot's instruments and copilot's instruments respectively and an alternate static system having conduits 132 and 134 respectively for the pilot's instruments and the copilot's instruments respectively are provided. It is important that the proper three-dimensional cam 124 and 126 is utilized in conjunction with its previously calibrated primary static system or alternate static system. In order to assure that the proper cam and static system for each of the pilot and copilot instruments is utilized, a novel static system selector 136 and 138 respectively is used for the pilot and copilot respectively.

Each of static system selectors 136 and 138 comprises a selector valve mechanism wherein the primary static system or alternate static system may be alternately connected to an output static system conduit 140 or 142 respectively, these output conduits being applied to the various instrument casings. The same operating handle that operates the conduit valve, however, is ganged to operate electrical switches 144 and 146 respectively, for pilot and copilot respectively, wherein switch 144 is movable from a normal position connecting to the output of cam 124 in the pilot's computer unit to an alternate position connecting to the output of cam 126 in the copilot's computer unit.

Accordingly, when the primary static system in the associated computer unit is selected within either of static system selectors 136 and 138, the primary static system cam 124 in the associated computer unit is necessarily used as the computer unit output device.

Similarly, if the alternate static system is selected within the static system selector unit, connection is made to the output of the alternate cam 126 in the opposite computer unit.

Both the pilot and copilot are provided with scale error correction systems 148 and 150 specifically for their altimeters 50 and 52 respectively. These scale error correctors comprise an adjustable cam surface 152 which is calibrated in conjunction with the particular altimeter associated therewith. An adjustable cam surface 152 is positioned by servo motor 154 which is operated by a signal from Synchrotel 156 which is attached to the altimeter pointer within casing 50 or 52 respectively, and to a synchro which is driven by the adjustable cam and tends to decrease the error signal to zero. This error signal is, of course, amplified in the usual manner by amplifier 158 whereby motor 154 drives adjustable cam 152 until the cam is positioned in accordance with the position of altimeter pointer 56.

The position of adjustable cam 152 is transmitted to a cam follower 160 which in turn adjusts a differential synchro which adds a static error signal from the computer unit to the scale error correction signal, as described in the above noted copending application, and the differential synchro then operates to position a synchro 162 within altimeters 50 (or 52) to subsequently cause a motor 164 to rotate the mechanism body of the altimeter as seen in my copeding application Serial No. 614,670 filed October 8 1956 entitled Aircraft Instrument-Remote Control-Fail Safe, now Patent No. 3,009,-357, so that pointer 56 will move with respect to its indicating dial so as to electrically correct the altimeter for scale error correction.

The three-dimensional cams are so operated that they are rotated in accordance with the Mach number indication and are axially translated responsive to the angle of attack indication. More specifically, the output of Synchrotel 114 which is an electrical indication of Mach number is applied for example to the stator of synchro 160. Because of the displacement between the rotor and the stator of synchro 161 an electrical signal is applied to amplifier 163 and thereafter to servo motor 165.

Servo motor 165 then rotates to rotate both the rotor of synchro 161 and three-dimensional cams 124 and 126 until such a time that the rotor and stator deliver no further electrical output signal and the cams are angularly positioned in accordance with this predetermined Mach number.

In a similar manner, the signal from the angle of attack sensor 42 is applied to a synchro 166 which drives motor 168 through amplifier 170 until the cam surfaces driven by the motor in a transverse direction are properly positioned.

Thus, both angle of attack and Mach number serve to position the three-dimensional cam surface of cams 124 and 126 in a predetermined position whereby the cam followers 172 and 174 are appropriately positioned.

Cam followers 172 and 174 are shown as being connected to synchros 176 and 178 respectively which impress a signal on their respective differential synchros in their respective scale error correctors to subsequently aid in the positioning of the altimeter mechanism bodies through motor 164.

It is to be noted that synchro 176 related to cam 124 of the pilot's primary static system is operable only when switch 144 is in the normal position and the primary static system is in use. Similarly, cam 126 is operable only when switch 146 of the copilot's static system selector is in the alternate position.

In a similar manner, the computer unit 122 of the copilot's instruments has cam 126 operable only when the pilot's static system selector is in the alternative position, and the cam 124 which is operable only when the copilot static system selector is in the normal or primary static system position.

True outside air temperature indicator

The pilot and copilot have true outside air temperature indicators 186 and 188 respectively available to them as shown in FIGURE 1A. The copilot's true outside air temperature indicator hereinafter denoted as the TOAT indicator is driven from the output of the pilot's indicator 186 by a synchro means, as will be described hereinafter.

TOAT indicator 186 is the indicator which receives all the information required to measure the true outside air temperature. The true outside air temperature T indicated by indicator pointer 190 is computed from the relation $$T = \frac{T \text{ (Indicated)}}{1 + 0.2 K_1 M^2}$$

The indicated temperature or T (Indicated) is measured by the temperature bulb 192 which is mounted externally of the aircraft in some predetermined position. The Mach number M required in determining the true outside air temperature is derived from either computer 120 or 122 which, as will be described hereinafter, calculates the denominator of the above noted equation and supplies it to the instrument.

The temperature to which temperature bulb 192 is exposed adjusts the resistance of resistor 194 contained therein so as to vary the total resistance of parallel conected resistor 194 and resistor 196 which is in one leg of the Wheatstone bridge circuit shown. The adjacent leg of the Wheatstone bridge circuit receives the function $1 + 0.2 K_1 M^2$.

When the bridge is unbalanced, an output voltage is delivered from the bridge to amplifier 200 which drives a servo system including servo motor 202 and synchro 204. The motor 202 is connected to vary the movable arm 206 of potentiometer 208 in such a direction as to balance the bridge circuit and bring the output voltage of the bridge to zero. It will be understood by those skilled in the art that the adjustment of the potentiometer under voltage balanced conditions will be proportional to T (Indicated) divided by $(1 + 0.2 K_1 M^2)$.

The motor 202 positions the TOAT indicator pointer 190, as schematically indicated, as well as synchro 204 which is used to transmit the indication to the slave indicator. Once this zero condition is reached, it is clear that the TOAT indicator pointer 190 is positioned at the appropriate value equal to the true outside air temperature.

The synchro transmitter 204 is connected to the copilot's slave TOAT indicator 188 through the connection including follower synchro 210 which positions pointer 212 of indicator 188 in accordance with the positioning of servo 204 which is functionally related to the position of pointer 190.

It is to be further noted that motor 202, in positioning pointer 190, further adjusts poteniometers 216 and 214 to supply electrical parameters which are proportional to the true outside air temperature and the square root of the true outside air temperature respectively. These two functions, as will be seen hereinafter, are utilized in the ram air temperature indicator (RAT) and the true airspeed indicator (TAS) respectively.

True airspeed indicator

The pilot and copilot each have a true airspeed indicator 215 and 217 respectively where the copilot's indicator 217 is a slave indicator driven by the pilot's indicator 215. Since true airspeed is computed from the equation $$V = 38.94 M \sqrt{T}$$

a Wheatstone bridge computer device having the square root of the true outside air temperature and the Mach number as inputs is provided.

The Mach number is, as was the case in the TOAT indicator, taken from either of computers 120 or 122, and the signal proportional to the square root of the true outside air temperature is taken from potentiometer 214 of the TOAT indicator. In this case, the two signals are applied to opposing legs of the bridge, and the bridge may be balanced by adjusting movable arm 218 of potentiometer 220 to give an indication of the product of the two inputs. The potentiometer 222 is utilized as a ranging adjustment for the instrument.

The output of the bridge is applied to the servo system including amplifier 224, servo motor 226 and synchro 228 which are inter-related in the well known manner to drive a digital type of indicator 230. Thus, as a signal appears on the output of the bridge indicating a change in either Mach number or true outside air temperature, the motor 126 is energized so as to operate synchro 228 to bring the bridge back to balance by varying potentiometer 220 and, at the same time, operates the digital indicator 230 to display the true airspeed.

As was the case with the TOAT indicator, transmitter synchro 228 is associated with a repeater synchro 232 of the slave true airspeed indicator 216 to thereby position indicator 234 in accordance with the reading of indicator 230.

Ram air temperature measurement

The pilot and copilot further have ram air temperature indicators 236 and 238 respectively, where indicator 238 is a slave indicator driven by the pilot's indicator 236. Ram air temperature may be computed from $$T_{(Ram)} = T(1 + 0.2 K_2 M^2)$$

Similar to the case in indicator 215, a Wheatstone bridge is utilized in multiplying true outside air temperature taken from potentiometer 216 and the quantity $1 + 0.2 K_2 M^2$ taken from either computer 120 or 122.

The ram air temperature indicator bridge circuit further includes a range adjusting potentiometer 240 and a servo driven potentiometer 242 utilized to balance the bridge when there is an output signal. The servo system includes the amplifier 244, servo motor 246 and synchro 248 where the motor 246 drives each of the potentiometer 242, servo 248 and indicating means 250 so as to maintain a zero output signal from the bridge.

As was the case with instruments 186 and 215, synchro 248 is associated with a repeater synchro 252 which drives indicator 254 of the copilot's slave ram air temperature indicator 238.

Integration of instruments

From the foregoing, certain novel features of this invention have become apparent. It is now possible to describe the other novel features heretofore mentioned in the integration of the various components.

The first of these novel features is the manner in which the pilot's computer 120 and the copilot's computer 122 may be checked against one another so as to indicate the malfunctioning of one of the computers. This novel correlation is achieved by taking the outputs from synchros in the two scale error correctors which actually repeat the positions of the two altimeter pointers which have been corrected by the computer. If the system were perfect, these synchros, as well as the altimeter pointers, would have the same position. In the event of a mismatch which would indicate the malfunctioning of one of the systems, a warning light 262 will be energized through an appropriate energizing means 260 which could be a switching device.

The second novel manner in which the various instruments are correlated is in the derivation of a Mach number signal from the Mach number measuring means 70. As has been previously described, a Mach number signal is required for the operation of the three-dimensional cams 124 and 126 of computers 120 and 122 respectively, and it is further needed in the operation of the true outside air temperature indicator, the true air speed indicator and the ram air temperature indicator.

In accordance with the instant invention, the Mach number is pneumatically measured a single time by instrument 70, the Synchrotel 114 is positioned in accordance with this measurement. The output of Synchrotel 114 then operates the servo system including synchro 161, amplifier 163 and servo motor 165 where servo motor 165 drives the cams 124 and 126. However, it is also seen that motor 164 positions potentiometers 264, 266 and 268 respectively, as shown in FIGURE 1.

Potentiometer 264 is calibrated to deliver a signal proportional to $1+0.2K_1M^2$. Thus, as the mach number M varies, the resistance of potentiometer 264 varies in accordance with the above noted relation. This function is then transmitted through a computer selector switch 270 contained within switch panel 272, and is selectively delivered to the true outside air temperature indicator 186. More specifically, when switch 270 is turned to "P," the $1+0.2K_1M^2$ signal is taken from computer 120. When, however, the switch is turned to "C," the $1+0.2K_1M^2$ signal is taken from the copilot's computer 122.

Potentiometer 266, as indicated in FIGURE 1, delivers a signal proportional to the Mach number M, and is delivered to the true airspeed indicator which requires this signal through the switch 274 which selects either the pilot's computer 120 or the copilot's computer 122.

Finally, potentiometer 268 which supplies a signal $1+0.2K_2M^2$ is connected to the ram air temperature indicator through switch 276.

Accordingly, by making a single Mach number measurement in Mach number indicators 70 or 72, the Mach number is transmitted to a plurality of different instruments requiring different functions of the Mach number. That is to say, the single Mach number measuring means which includes all of the equipment from indicators 70 or 72 to the panels 272 provides signals functionally related to Mach number at terminals A–B, C–D, and E–F.

As has been stated above, both a primary static system and alternate static system are provided for driving the pneumatic-responsive instruments of the system. The primary and alternate systems are associated with a respective computer cam 124 or 126, and each of the valve selecting means 136 for the pilot and 138 for the copilot is ganged to an electrical selecting switch so that the appropriate computer cam is always utilized with the proper pressure system.

A further novel correlation provided in this novel integrated system has been heretofore described in conjunction with the electrically operated TOAT, TAS and RAT indicators. In general, this novel integration is seen to comprise a single measurement of the true outside air temperature by instrument 186. This measured value is then translated into functions of the true outside air temperature which are required by the TAS indicator and RAT indicator by means of potentiometers 214 and 216 respectively.

Therefore, instruments 188, 217 and 238 are all slave-driven instruments corresponding to the TOAT indicator 186, the TAS indicator 215 and the RAT indicator 236 respectively of the pilot's instruments.

The temperature as indicated by bulb 192 constitutes a parameter, of which true outside air temperature, true airspeed, and ram air temperature are first, second and third functions, respectively, indicated by first, second and third instruments 190, 230 and 250, respectively, as actuated by the systems including servos 202, 226 and 246, respectively.

A further feature of this integrated flight system is that a single angle of attack measurement by the angle of attack measuring sensor 42 is utilized in driving both the angle of attack indicators 20 and 22, as well as providing the angle of attack signal required for the static correction of computers 120 and 122. Accordingly, it is once again seen that unnecessary duplication of equipment is avoided.

Although I have described preferred embodiments of my novel invention, many variations and modifications will now be obvious to those skilled in the art, and I prefer therefore to be limited not by the specific disclosure herein but only by the appended claims.

I claim:

1. In an integrated flight instrument system; a first and second instrument, a temperature measuring means, and a Mach number measuring means; said first instrument indicating a first function of temperature; said second instrument indicating a second function of temperature; a first and second servo system for said first and second instruments respectively; each of said first and second servo systems having respective input and output connections; said input connections of said first servo system being connected to said temperature measuring means; said output connections of said first servo system being directly connected to said first instrument; said output connections of said first servo system being further connected to input means associated with said input connections of said second servo system; said output connections of said second servo system being connected to said second instrument; said first servo system driving said first instrument in accordance with said first function of temperature; said first servo system driving said input means associated with said second servo system to permit said second servo system to drive said second instrument in accordance with said second function of temperature; said Mach number measuring means being connected to said input connection of each of said first and second servo systems.

2. In an integrated flight instrument system, a first, second and third indicating instrument; a measuring means for measuring a parameter; each of said first, second and third instruments indicating different functions respectively of said measured parameter; a first, second and third servo system for said first, second and third instruments respectively; each of said first, second and third servo systems having respective input and output means; said input means of said first servo system being directly connected to said measuring means for measuring said parameter; said output means of said first servo system being connected to said first instrument and being connected to said input means of said second servo system; said output means of said second servo system being connected to said second instrument; said output means of said first servo system being further connected to said input means of said third servo system; said output means of said third servo system being connected to said third instrument.

3. A flight instrument system substantially as set forth in claim 2; said first instrument comprising a true air temperature indicator; said second instrument comprising a true airspeed indicator; said third instrument comprising a ram air temperature indicator.

4. The device substantially as set forth in claim 3 which further includes a Mach number measuring means; said Mach number measuring means being operable for generating signals functionally related to Mach number; said Mach number measuring means being connected to said input means of each of said first, second and third servo systems.

References Cited by the Examiner

UNITED STATES PATENTS

| | | | |
|---|---|---|---|
| 2,196,416 | 4/40 | Jacob | 74—567 |
| 2,445,335 | 7/48 | Philbrick et al. | 244—78 |
| 2,512,278 | 6/50 | Jones | 73—182 X |
| 2,512,790 | 6/50 | Cleveland | 73—182 X |
| 2,522,337 | 9/50 | Angst | 73—182 |
| 2,537,580 | 1/51 | Garnier | 73—182 |
| 2,598,681 | 6/52 | Garbarini et al. | 73—182 |
| 2,751,786 | 6/56 | Coulbourn | 73—182 |
| 2,842,324 | 7/58 | Jude et al. | 244—77 |
| 2,969,910 | 1/61 | Reuter | 73—182 |
| 3,009,358 | 11/61 | Angus | 73—384 |

FOREIGN PATENTS 689,066 3/53 Great Britain.
415,986 11/46 Italy.

OTHER REFERENCES

"Flight" article, pages 579, 580, 585, June 19, 1947.

ROBERT B. HULL, *Primary Examiner.*

ISAAC LISANN, *Examiner.*